United States Patent [19]
Richardson et al.

[11] Patent Number: 5,764,933
[45] Date of Patent: Jun. 9, 1998

[54] DEADLOCK PREVENTION IN A TWO BRIDGE SYSTEM BY FLUSHING WRITE BUFFERS IN THE FIRST BRIDGE

[75] Inventors: Nicholas J. Richardson, LaJolla, Calif.; David Ross Evoy, Tempe; Franklyn Story, Chandler, both of Ariz.

[73] Assignee: VLSI Technology, Inc., San Jose, Calif.

[21] Appl. No.: 606,603

[22] Filed: Feb. 26, 1996

[51] Int. Cl.$^6$ ............................................. G06F 13/14
[52] U.S. Cl. ........................... 395/308; 395/309; 395/287
[58] Field of Search ............................. 395/306–309, 395/293, 287

[56] References Cited

U.S. PATENT DOCUMENTS

| | | | |
|---|---|---|---|
| 5,475,854 | 12/1995 | Thomsen et al. | 395/800 |
| 5,535,341 | 7/1996 | Shah et al. | 395/306 |
| 5,596,729 | 1/1997 | Lester et al. | 395/308 |
| 5,613,075 | 3/1997 | Wade et al. | 395/287 |
| 5,625,779 | 4/1997 | Solomon et al. | 395/293 |

*Primary Examiner*—Ayaz R. Sheikh
*Assistant Examiner*—Sumati Lefkowitz
*Attorney, Agent, or Firm*—Douglas L. Weller

[57] ABSTRACT

A method for preventing deadlocks is used in a computing system in which a host bus is connected to a first input/output bus through a first bridge and the first input/output bus is connected to a second input bus through a second bridge. When transferring data from a first input/output device on the second input/output bus to a memory on the host bus, the first input/output device requests mastership of the second input/output bus. Before granting mastership to the first input/output device, the second bridge instructs the first bridge to flush and disable write buffers within the first bridge. After the write buffers have been flushed, the first input/output device is granted mastership of the second input/output bus. The second bridge requests mastership of the first input/output bus by asserting a request signal on a request line. The first bridge then obtains mastership of the host bus in order to allow the transfer of the data from the first input/output device to the memory. In the present invention, the second bridge instructs the first bridge to flush and disable write buffers within the first bridge by asserting and deasserting in a first pattern the request signal.

17 Claims, 2 Drawing Sheets

DEADLOCK PREVENTION IN A TWO BRIDGE SYSTEM BY FLUSHING WRITE BUFFERS IN THE FIRST BRIDGE

BACKGROUND

This invention relates generally to bus bridges and particularly to a method for bus arbitration which maintains concurrency between two busses.

In order to conserve bandwidth and maximize performance, computing systems often utilize layers of busses. Thus, while a processor and main memory are generally connected to a host bus, a special input/output (I/O) bus is used for the connection of I/O devices to a computing system. Bus bridges are used to separate bus layers. Data flowing from one bus to another bus travels through a bus bridge.

In order to increase performance of computing systems, I/O bus protocols are developed and improved to allow faster and more efficient transfer of information over the I/O buses. One commonly used bus protocol is the Industry Standard Architecture (ISA) bus protocol. Another, commonly used bus protocol is the Peripheral Component Interconnect (PCI) bus protocol.

It is not uncommon that different bus layers operate according to different bus protocols. For example, a host bus is connected through a first (host-to-PCI) bridge to a first I/O bus which operates in accordance with the PCI bus protocol. The first I/O bus is connected through a second (PCI-to-ISA) bridge to a second I/O bus which operates in accordance with the ISA bus protocol.

When utilizing such bus layering it is desirable to use arbitration schemes which allow buses to act as independently as possible. For example, if an I/O device on the second I/O bus wants to transfer data to a main memory on the host bus, one way to allow for performance of this transaction is for the second bridge to hold control of the first I/O bus during the entire transaction. However, this can result in a significant performance penalty when the first I/O bus has significantly higher performance than the second I/O bus. It is generally desirable then to allow the first I/O bus to perform additional transactions concurrently with transactions originating from the second I/O bus.

One problem with using concurrent bus transactions is the potential for deadlock. Deadlock occurs when the two busses have incompatible requirements. In order to avoid deadlock it is necessary to determine the circumstances in which the deadlock occurs and remove the possibility that such circumstances occur. This can be done, for example, by appropriately limiting the concurrency of operations of the two busses. Alternatively, additional sideband signals can be utilized which essentially operate as an additional level of protocol to either prevent deadlocks from occurring or to provide a way that deadlocks can be resolved.

For example, a host-to-PCI bridge between a PCI bus and a host bus buffers data in order to maximize efficient data transfer. Data to be written to the PCI bus is buffered in write buffers. When writing data from the PCI bus to the host-to-PCI bridge, it is necessary to make sure the write buffers are empty in order to maintain system coherency. The PCI bus, however, may be granted to a PCI master which attempts to write data through the host-to-PCI bridge to the main memory at the same time (or just after) an entity (such as a processor) data is transferred to the write buffers within the host-to-PCI bridge. In order to prevent a conflict, the host-to-PCI bridge issues a "RETRY" to the PCI bus master. This terminates the transaction and instructs the PCI bus master to try the transaction again. Then, the host-to-PCI bridge flushes the write buffers and disables the use of the write buffers until the PCI bus master which has retried is successful in completing its access to the main memory.

This solution works successfully unless the PCI master was acting on behalf of an ISA bus master. In the ISA bus protocol, ISA bus masters do not have any equivalent command to a "RETRY". Therefore, even though the RETRY causes the PCI master (in this case the PCI-to-ISA bridge) to release mastership of the PCI bus, the ISA bus master retains mastership of the ISA bus. This causes trouble when the data being flushed from the write buffers is destined for a device on the ISA bus. In such a case it is necessary to obtain mastership of the ISA bus in order to complete the flush of the write buffers. But this is impossible since the ISA bus master has retained mastership of the ISA bus. The result is a deadlock.

One way around the deadlock is to use sideband signals. For example, in a 82375EB PCI-to-EISA bridge available from Intel Corporation, having a business address of 1781 Fox Drive, San Jose Calif. 95131, an additional pin (FLSHREQ#) is included which is connected to a 82430 Hostto-PCI bridge also available from Intel Corporation. This signal can be used to flush the write buffers before a write from a device on the ISA bus to main memory 21 begins, so that the above-discussed deadlock will not occur. However, including these pins requires a significant additional amount of hardware.

SUMMARY OF THE INVENTION

In accordance with the preferred embodiment of the present invention power a method for preventing deadlocks is presented. The method is used in a computing system in which a host bus is connected to a first input/output bus through a first bridge and the first input/output bus is connected to a second input bus through a second bridge. For example, the first input/output bus operates according to the Peripheral Component Interconnect (PCI) bus protocol and the second input/output bus operates according to the Industry Standard Architecture (ISA) bus protocol.

When transferring data from a first input/output device on the second input/output bus to a memory on the host bus, the first input/output device requests mastership of the second input/output bus. Before granting mastership to the first input/output device, the second bridge instructs the first bridge to flush and disable write buffers within the first bridge. After the write buffers have been flushed, the first input/output device is granted mastership of the second input/output bus. The second bridge requests mastership of the first input/output bus by asserting a request signal on a request line. The first bridge then obtains mastership of the host bus in order to allow the transfer of the data from the first input/output device to the memory. In the present invention, the second bridge instructs the first bridge to flush and disable write buffers within the first bridge by asserting and deasserting in a first pattern the request signal.

In the preferred embodiment of the present invention, the first bridge grants the mastership of the first input/output bus to the second bridge by asserting a grant signal on a grant line. Likewise, the first bridge indicates that the write buffers have been flushed and disabled by asserting a grant signal on a grant line.

In the preferred embodiment, the second bridge asserts and deasserts in the first pattern as follows. The request signal is asserted for a first time period. The request signal is deasserted for a second time period. The request signal is asserted for a third time period. The request signal is deasserted. In the preferred embodiment, a duration of the first time period, the second time period and the third time period is one clock cycle of the first input/output bus (e.g., one PCI bus clock cycle).

In the preferred embodiment, the request line is also used to instruct the first bridge to enable the write buffers after the data is transferred. This is done by the second bridge asserting and deasserting in a second pattern the request signal. In the preferred embodiment, the second bridge asserts and deasserts in the second pattern as follows. The request signal is asserted for a first time period. The request signal is deasserted. In the preferred embodiment, a duration of the first time period, is one clock cycle of the first input/output bus (e.g., one PCI bus clock cycle).

The present invention allows an efficient solution to the deadlock described above. The solution does not utilize sideband signals that require additional pins.

DESCRIPTION OF THE PREFERRED EMBODIMENT

Figure 1:
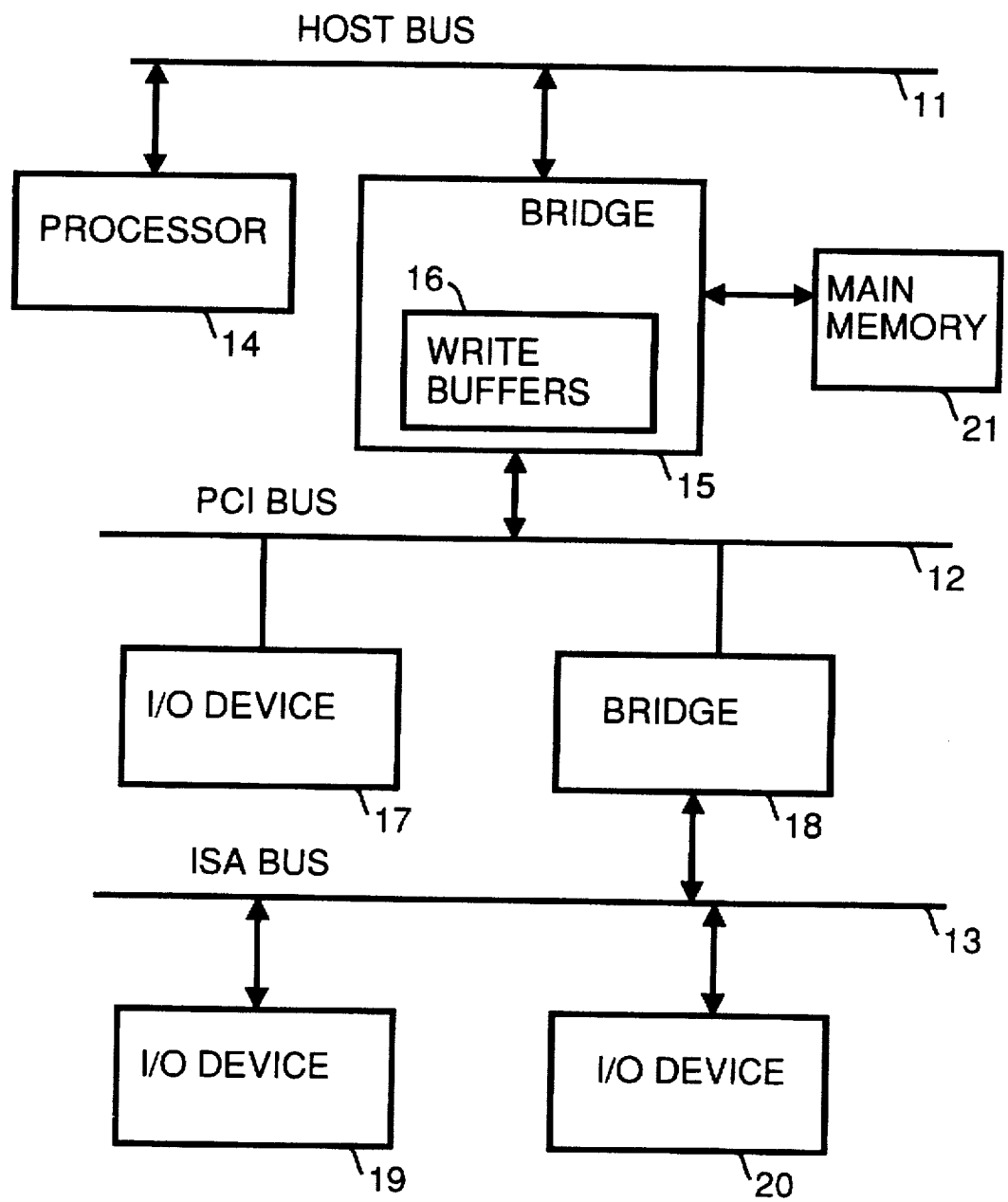
FIG. 1 shows a computing system with layers of busses.

FIG. 1 shows a computing system with multiple bus layers. A host bus 11 is connected to a processor 14. Processor 14 is, for example, a Pentium processor available from Intel Corporation, having a business address of 1781 Fox Drive, San Jose, Calif. 95131. Host bus 11 is, for example, a Pentium processor bus.

Host bus 11 is connected to first input/output (I/O) bus 12 through a bridge 15. I/O bus 12 operates in accordance with the Peripheral Component Interconnect (PCI) bus protocol, that has been modified as further described below. Various I/O devices may be connected to I/O bus 12. For example, an I/O device 17 is shown connected to I/O bus 12. In the preferred embodiment, a main memory 21 is connected to bridge 15.

I/O bus is connected to a second input/output (I/O) bus 13 through a bridge 18. I/O bus 13 operates in accordance with the Industry Standard Architecture (ISA) bus protocol. Various I/O devices may be connected to I/O bus 13. For example, an I/O device 19 and an I/O device 20 are shown connected to I/O bus 13.

Write buffers 16 within bridge 15 are used in order to allow data written through bridge 15 to PCI bus 12 to be buffered. When an entity attempts to write data through bridge 15 to main memory 21, it is necessary to flush the contents of write buffers 16. This is done in order to prevent the writing to main memory 21 of stale data which is due to be replaced by new data concurrently being buffered in write buffers 16.

Bridge 18 controls arbitration for mastership of bus 13. Bridge 15 controls arbitration for mastership of bus 12. Once a device has gained mastership of a particular bus, it is the bus master for that particular bus and can proceed with causing the execution of a particular transaction. For example, a device on I/O bus 13 which has won arbitration for mastership of I/O bus 13 is referred to as the ISA bus master. A device on I/O bus 12 which has won arbitration for mastership of I/O bus 12 is referred to as the PCI bus master. A device on host bus 11 which has won arbitration for mastership of host bus 11 is referred to as the host bus master.

When I/O device 17 desires to perform a write of data into main memory 21, I/O device 17 contends for mastership of PCI bus 12. Once I/O device 17 has obtained mastership of PCI bus 12, the write is performed through bridge 15 to main memory 21. Typically, bridge 15 will buffer the transaction data.

When I/O device 19 desires to perform a transaction with main memory 21, I/O device 19 contends for mastership of ISA bus 13. Once I/O device 19 has obtained mastership of ISA bus 13, I/O device 19 instructs bridge 18 to contend for mastership of PCI bus 12. Once bridge 15 has mastership of PCI bus 12, I/O device 19 performs the transaction over ISA bus 13 and PCI bus 12.

Since PCI bus 12 generally operates at a much higher performance level than ISA bus 13, during the time a transfer involving ISA bus 13 is set up and executed, additional transactions are performed over PCI bus 12.

When attempting to arbitrate host bus 11 and PCI bus 12 concurrently. PCI bus 12 may be granted to a PCI master which attempts to write data through bridge 15 to main memory 21 at the same time (or just after) an entity (such as processor 14) a data transfer is made to write buffers 16. In order to prevent a conflict, bridge 15 issues a "RETRY" to the PCI bus master. This terminates the transaction and instructs the PCI bus master to try the transaction again. Then, bridge 15 flushes write buffers 16 and disables the use of write buffers 16 until the PCI bus master which has retried is successful in completing its access to main memory 21.

This solution works successfully unless the PCI master was acting on behalf of an ISA bus master. In the ISA bus protocol, ISA bus masters do not have any equivalent command to a "RETRY". Therefore, even though the RETRY causes the PCI master (in this case bridge 18) to release mastership of PCI BUS 12 the ISA bus master retains mastership of ISA bus 13. This causes trouble when the data being flushed from write buffers 16 is destined for a device on ISA bus 13. In such a case it is necessary to obtain mastership of ISA bus 13 in order to complete the flush of write buffers 16. But this is impossible since the ISA bus master has retained mastership of ISA bus 13. The result is a deadlock.

One way around the deadlock is to use sideband signals. For example, in a 82375EB PCI-to-EISA bridge available from Intel Corporation, an additional pin (FLSHREQ#) is included which is connected to a 82430 Host-to-PCI bridge also available from Intel Corporation. These signals can be used to flush write buffers 16 before a write from a device on ISA bus 11 to main memory 21 begins, so that the above-discussed deadlock will not occur. However, including these pins requires a significant additional amount of hardware.

In the preferred embodiment of the present invention, rather than adding additional sideband signals, the PCI bus protocol is slightly modified. Specifically, in the PCI bus protocol, an REQ# line and a GNT# line are used to request and grant mastership of PCI bus 12. In the preferred embodiment the REQ# line and a GNT# line operate in accordance with the PCI Local Bus Specification, Revision 2.1, when in a default mode. However, when a configuration bit is set, the REQ# line and the GNT# line are utilized as the CREQ# and the CGNT# signals described below.

In the preferred embodiment, there are three types of commands bridge 18 can send to bridge 15 using the signal CREQ#: (1) Request Command (to request mastership of PCI bus 12); (2) Flush and Disable Command (to flush and disable write buffers 16); and (3) Enable Command (to enable write buffers 16).

Each of these three types of commands are described in separate sections below:

Acquisition of PCI bus 12 (Request Command)

Acquisition of PCI bus 12 by bridge 18 using the CREQ# and CGNT# pins is similar to normal PCI arbitration using the REQ# and GNT# signals defined by section 3.4 of the PCI Local Bus Specification, revision 2.1, with the exceptions noted below:

(1) Once bridge 18 drives CREQ# low to request acquisition of PCI bus 12, bridge 18 keeps CREQ# driven low for a minimum of two PCI clock cycles, even if bridge 18 wishes to cancel the request after having driven CREQ# for only one PCI clock cycle. This is to avoid conflict with the serial protocol commands for write buffer control described below (i.e., the Flush-and-Disable Command and the Enable Command). However, under normal conditions, bridge 18 will keep CREQ# driven low until some time after bridge 15 drives CGNT# low.

(2) Similarly, the arbiter of PCI bus 12 in bridge 15 does not grant PCI bus 12 to bridge 18 by driving CGNT# low until after bridge 15 has observed CREQ# driven low for at least two PCI clock cycles.

(3) In order to ensure low arbitration latencies to meet the 2.5 microsecond ISA guaranteed access time, the arbiter for PCI bus 12 in bridge 15 supports a mode of operation that makes CREQ# the highest priority PCI bus request. In this mode, bridge 18 is the highest priority PCI bus master, and once granted PCI bus 12 after asserting CREQ# for a minimum of two PCI clock cycles, bridge 18 cannot be preempted for as long as bridge 18 continues to assert CREQ#—i.e., once bridge 15 arbiter has driven CGNT# low in response to a two-clock-minimum assertion of CREQ# bridge 15 continues to keep CGNT# asserted (driven low) for as long as bridge 18 keeps CREQ# asserted (driven low).

(4) Except in parking mode (see (5) below), bridge 15 deasserts (i.e., drives high) CGNT# one clock after bridge 18 deasserts (i.e., drives high) CREQ#.

(5) The arbiter within bridge 15 may optionally support an ISA parking mode that permits parking of bridge 18 on PCI bus 12, by asserting CGNT# independently of whether bridge 18 asserts CREQ#, in which case bridge 18 may start a bus transaction over PCI bus 12 without asserting CREQ#, or assert CREQ# for two clocks after starting the first PCI bus transaction if bridge 18 wishes to perform multiple transactions. However, in high priority CREQ# mode (see (3) above), bridge 18 cannot assume that bridge 18 has non-preemptable ownership of PCI bus 12 unless it observes CGNT# asserted after bridge 18 has first asserted CREQ# for at least two PCI clock cycles. Additionally, in ISA parking mode bridge 15 deasserts CGNT# immediately after bridge 18 drives CREQ# low for one clock and then high for one clock, to avoid conflict with the CGNT# acknowledge pulse for the Flush-and-Disable command (see the discussion of the Flush-and-Disable command below).

(6) Since bridge 18 may be the highest priority PCI bus requester and non-preemptable, bridge 18 voluntarily throttles usage of PCI bus 12 sufficiently to avoid violating PCI bus latency guidelines described in section 3.5 of the PCI Local Bus Specification, Revision 2.1.

Figure 2:
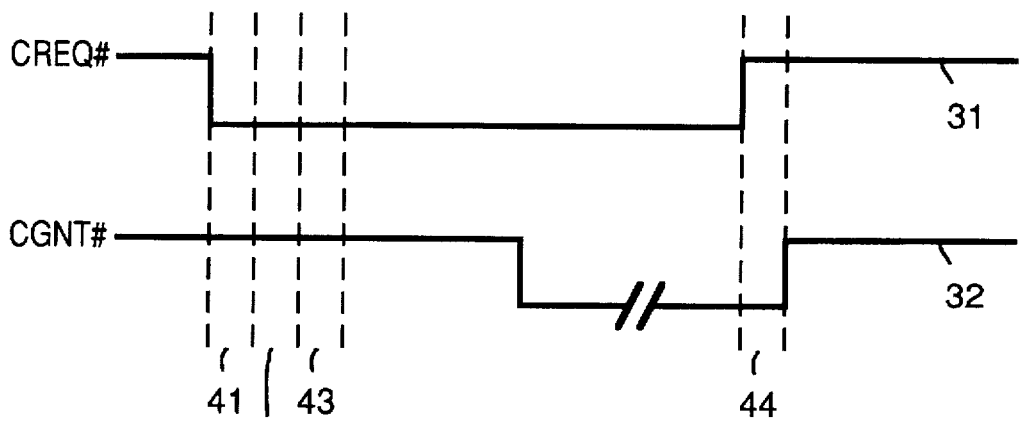
FIG. 2 shows signals used for bus acquisition in accordance with a preferred embodiment of the present invention.

FIG. 2 illustrates the acquisition of PCI bus 12 by bridge 18. At the beginning of a PCI bus cycle 41, bridge 18 drives CREQ# signal 31 low and holds CREQ# signal 31 low for at least two PCI bus cycles. FIG. 2 shows CREQ# signal 31 held low through PCI bus cycles 42, 43 and beyond. Sometime after bridge 18 has held CREQ# signal 31 low for at least two PCI bus cycles bridge 15 drives CGNT# signal 32 low, indicating a grant of PCI bus 12 to bridge 15. As long as bridge 18 holds CREQ# signal 31 low, bridge 18 retains mastership of PCI bus 12. As illustrated by PCI bus cycle 44, one clock after bridge 18 drives CREQ# signal 31 high, bridge 15 drives CGNT# signal 32 high.

Flush and Disable Command

The Flush-and-Disable command is sent by bridge 18 to bridge 15 after an ISA master or DMA device has requested use of ISA bus 13 by asserting its DREQ# signal, but before bridge 18 grants ISA bus 13 to the requesting ISA device by asserting its associated DACK# signal. The DREQ# signal and the DACK# signal are part of the ISA bus protocol. On receiving this command, bridge 15 (and any Common Architecture Host bridge that contains CPU-to-PCI bus memory write buffers that can hold memory write data destined for ISA bus 13 via bridge 15) flushes and disables those buffers. For the computing system shown in FIG. 1, this means that write buffers 16 in bridge 15 are flushed and disabled. In this case bridge 18 and bridge 15 obey the following rules for correct operation of the Flush-and-Disable command:

(1) When bridge 18 detects a request for ISA bus mastership due to an ISA master or DMA requester asserting one of the DREQ# signals, bridge 18 requests disabling and flushing of write buffers 16 within bridge 15 by driving CREQ# low for a single clock, high for a single clock, and low for a single clock, and then continue to drive the CREQ# line high. Bridge 18 then waits until bridge 15 signals completion of the Flush-and-Disable operation by assertion of CGNT# before granting ISA bus 13 to the requesting device by asserting its DACK# signal, during which time bridge 18 is able to service normal PCI requests for access to ISA slaves.

(2) On receiving the Flush-and-Disable command, if bridge 15 contains memory write buffers that can hold memory write data destined for ISA bus 13 (i.e., write buffers 16 are implemented), bridge 15 disables posting of CPU write requests into write buffers 16 and flushes any existing requests in write buffers 16 to their respective destinations on PCI bus 12. In order to reduce ISA DREQ# to DACK# latencies, bridge 15 gives highest bus priority to its own PCI master interface during this operation. Additionally, when bridge 15 observes CREQ# asserted for one clock and then deasserted for one clock, bridge 15 immediately deasserts CGNT# if bridge 15 has kept CGNT# asserted to park bridge 18 on PCI bus 12 when operating in ISA parking mode.

(3) After having finished flushing write buffers 16, and ensuring that no more data can be posted by processor 14 into write buffers 16, bridge 15 acknowledges completion of the Flush-and-Disable command by pulsing the CGNT# signal low for one PCI clock cycle.

(4) On detecting the one PCI clock cycle pulse on CGNT#, bridge 18 may grant ISA bus 13 to the requesting ISA bus agent (by asserting the associated DACK# signal).

(5) After generating the Flush-and-Disable command, bridge 18 drives the CREQ# signal high until bridge 15 acknowledges completion of the operation by driving CGNT# low for one PCI clock cycle (i.e. CREQ# cannot be used by bridge 18 to make normal PCI bus requests while awaiting completion of the Flush-and-Disable command).

(6) In systems that implement full PCI bus locking, a deadlock may occur if a PCI agent succeeds in establishing a lock to an ISA slave simultaneously with bridge 15 sending a Flush-Acknowledge to bridge 18, allowing bridge 18 to grant ISA bus 13 to a requesting ISA agent after the lock has been established. To avoid this situation, bridge 15 does not send the Flush-Acknowledge pulse on CGNT# until PCI bus 12 is idle and LOCK# is inactive, and ISA bridges that do not monitor the LOCK# signal retry any PCI requests for ISA slave accesses that arrive simultaneously with or after the CGNT# Flush-Acknowledge pulse to prevent a lock to an ISA location from being established before the ISA bridge asserts DACK#. ISA bridges that monitor the LOCK# signal may alternatively hold-off asserting DACK# after receiving a Flush-Acknowledge pulse until they detect that there is no established lock to an ISA location.

Figure 3:
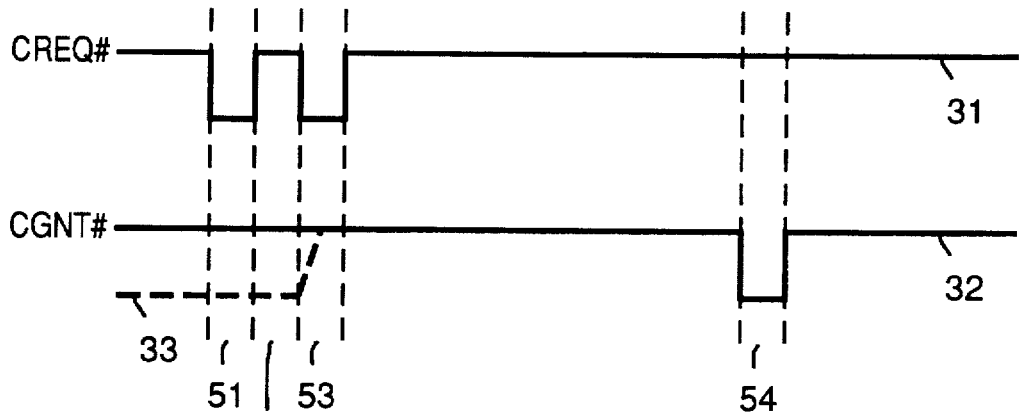
FIG. 3 shows signals used to direct and acknowledge the flushing and disabling of write buffers within a bridge in accordance with a preferred embodiment of the present invention.

FIG. 3 illustrates the use of the Flush-and-Disable command by bridge 18. Bridge 18 asserts the Flush-and-Disable command by driving CREQ# signal 31 low during PCI bus cycle 51, by driving CREQ# signal 31 high during PCI bus cycle 52, by driving CREQ# signal 31 low during PCI bus cycle 53, and then by driving and holding CREQ# signal 31 high. Once bridge 15 has completed flushing write buffers 16 and ensuring that no more data can be posted by processor 14 into write buffers 16, bridge 15 drives CGNT# signal 32 low, as illustrated in PCI clock cycle 54. Dotted line 33 in FIG. 3 illustrates that CGNT# signal 32 may initially be active (i.e. low) in the ISA parking mode.

Write Buffer Enable Command

To request the enabling of write buffers 16 within bridge 15, bridge 18 drives CREQ# low for a single clock, and high for at least two additional clocks. The Host Bridge does not send a response on CGNT# to the enable request, and bridge 18 therefore does not wait for one.

On receiving an Enable request, bridge 15 will re-enable write buffers 16 at the earliest time it is able to do so. However, at any time bridge 15 is capable of responding to another Flush-and-Disable request, even if that command preempts processing of an Enable request.

It is recommended that bridge 18 sends an Enable request to bridge 15 on completion of an ISA master or DMA transaction when no more DREQ# requests are active.

Figure 4:
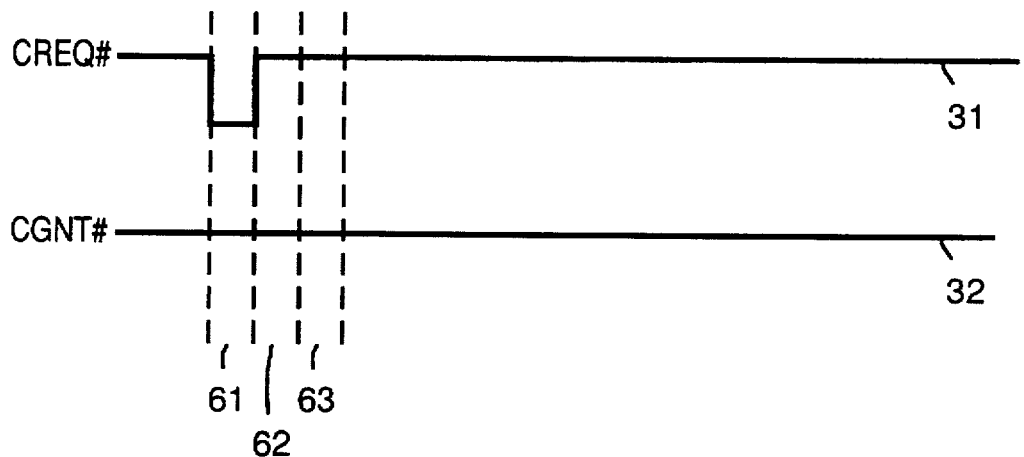
FIG. 4 shows signals used to direct the enabling of write buffers within a bridge in accordance with a preferred embodiment of the present invention.

FIG. 4 illustrates the issuance of the Enable command by bridge 18. Bridge 18 asserts the Enable command by driving CREQ# signal 31 low during PCI bus cycle 61. During subsequent PCI bus cycles 62 and 63, bridge 18 drives and holds CREQ# signal 31 high. Bridge 15 does not give a response on CGNT# to the enable request, and bridge 18 therefore does not wait for one.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We Claim:

1. In a computing system in which a host bus is connected to a first input/output (I/O) bus through a first bridge and the first input/output bus is connected to a second I/O bus through a second bridge, a method for signaling the first bridge by the second bridge comprising the following steps:

(a) acquiring mastership of the first input/output bus by the second bridge utilizing the following substeps:

(a.1) asserting a request signal on a request line by the second bridge, and (a.2) asserting a grant signal on a grant line by the first bridge to indicate that the second bridge has been granted mastership of the first input/output bus; and, (b) instructing the first bridge to flush and disable write buffers within the first bridge utilizing the following substep:

(b.1) asserting and deasserting in a first pattern the request signal by the second bridge.

2. A method as in claim 1 wherein step (b) includes the following additional substep:

(b.2) asserting the grant signal by the first bridge to indicate that the write buffers have been flushed and disabled.

3. A method as in claim 1 wherein in substep (b.1) asserting and deasserting in the first pattern the request signal includes the following substeps:

asserting the request signal for a first time period; deasserting the request signal for a second time period; asserting the request signal for a third time period; and, deasserting the request signal.

4. A method as in claim 3 wherein in substep (b.1) a duration of the first time period, the second time period and the third time period is one clock cycle of the first input/output bus.

5. A method as in claim 1 wherein the first input/output bus operates according to the Peripheral Component Interconnect (PCI) bus protocol and the second input/output bus operates according to the Industry Standard Architecture (ISA) bus protocol.

6. A method as in claim 1 additionally comprising the following step:

(c) instructing the first bridge to enable the write buffers within the first bridge utilizing the following substep:

(c.1) asserting and deasserting in a second pattern the request signal by the second bridge.

7. A method as in claim 6 wherein in substep (c.1) asserting and deasserting in the second pattern the request signal includes the following substeps:

asserting the request signal for a first time period; and, deasserting the request signal.

8. A method as in claim 7 wherein in substep (c.1) a duration of the first time period is one clock cycle of the first input/output bus.

9. A method for preventing deadlocks in a computing system in which a host bus is connected to a first input/output (I/O) bus through a first bridge and the first input/output bus is connected to a second I/O bus through a second bridge, the method comprising the following step:

(a) transferring data from a first input/output device on the second input/output bus to a memory on the host bus utilizing the following substeps:

(a.1) requesting mastership of the second input/output bus by the first input/output device, (a.2) before granting mastership to the first input/output device, instructing, by the second bridge, the first bridge to flush and disable write buffers within the first bridge, (a.3) granting mastership of the second input/output bus to the first input/output device, (a.4) requesting mastership of the first input/output bus by the second bridge, including the following substep
  (a.4.1) asserting a request signal on a request line by the second bridge,
(a.5) granting mastership of the first input/output bus to the second bridge, and,
(a.6) transferring the data from the first input/output device to the memory;
wherein substep (a.2) includes the following substep:
  (a.2.1) asserting and deasserting in a first pattern the request signal by the second bridge.

10. A method as in claim 9 wherein substep (a.4) includes the following additional substep:
  (a.4.2) asserting a grant signal on a grant line by the first bridge to indicate that the second bridge has been granted mastership of the first input/output bus.

11. A method as in claim 10 wherein substep (a.2) includes the following additional substep:
  (a.2.2) asserting the grant signal by the first bridge to indicate that the write buffers have been flushed and disabled.

12. A method as in claim 9 wherein in substep (a.2.1) asserting and deasserting in the first pattern the request signal includes the following substeps:
  asserting the request signal for a first time period;
  deasserting the request signal for a second time period;
  asserting the request signal for a third time period; and,
  deasserting the request signal.

13. A method as in claim 12 wherein in substep (a.2.1) a duration of the first time period, the second time period and the third time period is one clock cycle of the first input/output bus.

14. A method as in claim 9 wherein the first input/output bus operates according to the Peripheral Component Interconnect (PCI) bus protocol and the second input/output bus operates according to the Industry Standard Architecture (ISA) bus protocol.

15. A method as in claim 9 additionally comprising the following step:
  (b) instructing the first bridge to enable the write buffers within the first bridge utilizing the following substep:
    (b.1) asserting and deasserting in a second pattern the request signal by the second bridge.

16. A method as in claim 15 wherein in substep (b.1) asserting and deasserting in the second pattern the request signal includes the following substeps:
  asserting the request signal for a first time period; and,
  deasserting the request signal.

17. A method as in claim 16 wherein in substep (b.1) a duration of the first time period is one clock cycle of the first input/output bus.

* * * * *